(No Model.)
F. W. GIBSON.
COMBINED MILL AND SCALE.
No. 581,068. Patented Apr. 20, 1897.
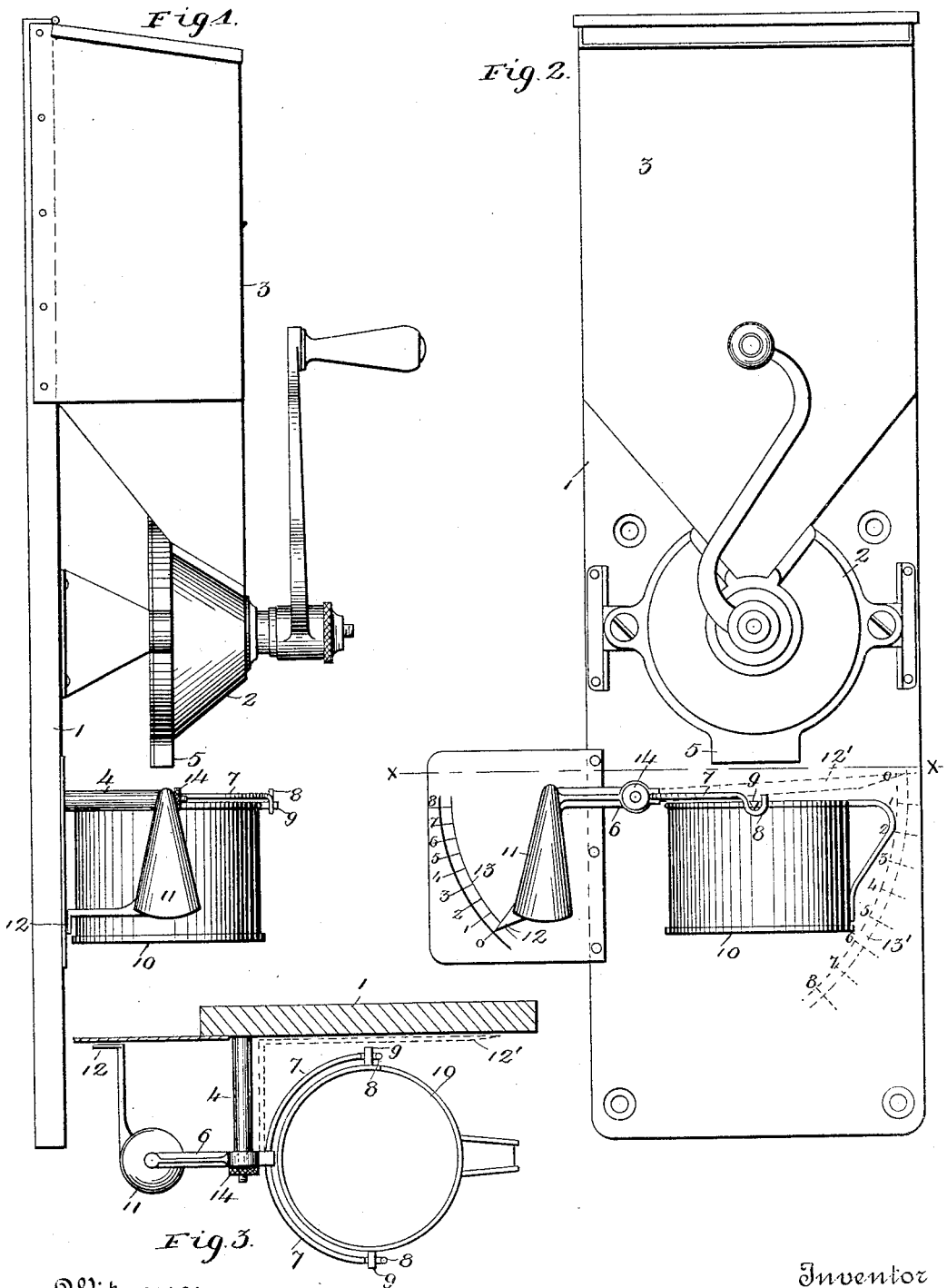
Witnesses
Alfred A. Muthey
Chris Ballet
Inventor
Frank W. Gibson.
By his Attorneys
Keller & Starek

United States Patent Office.

FRANK W. GIBSON, OF ST. LOUIS, MISSOURI.

COMBINED MILL AND SCALE.

SPECIFICATION forming part of Letters Patent No. 581,068, dated April 20, 1897.

Application filed November 30, 1896. Serial No. 613,889. (No model.)

*To all whom it may concern:*

Be it known that I, FRANK W. GIBSON, a citizen of the United States, residing at St. Louis, State of Missouri, have invented certain new and useful Improvements in a Combined Mill and Scale, of which the following is a full, clear, and exact description, reference being had to the accompanying drawings, forming a part hereof.

My invention has relation to improvements in combined mills and weighing apparatus; and it consists in the novel arrangement and combination of parts more fully set forth in the specification and pointed out in the claim.

In the drawings, Figure 1 is a side elevation of my complete invention. Fig. 2 is a front elevation of the same, and Fig. 3 is a horizontal section on the line *x x* of Fig. 2.

The object of my invention is to construct a combined mill and weighing apparatus or scale designed to be used especially by housewives, hotel-cooks, and the like, and being particularly designed for weighing out ground coffee in quantities which may correspond either to actual weights of coffee ground or to the number of cups (or other measure) of liquid coffee or beverage to be served. To this end I have devised a weighing apparatus which in detail may be described as follows:

Referring to the drawings, 1 represents a suitable frame or plate, to one of the faces of which the mill 2 and the hopper 3 thereof are secured in any mechanical manner. Pivoted at the free end of an arm 4, projecting from the plate 1 at a point to one side of the medial line of the delivery-mouth 5 of the mill, is a weighing-lever 6, to the short arm of which is secured a yoke or segmental band 7, the free ends of the arms thereof being normally located in line with the middle of the mouth 5 and having formed thereon suitable upturned hooks or saddles 8 for the reception of the outwardly-projecting knife-edged trunnions 9, carried along the upper edge of a detachable weighing-cup 10. The free end of the long arm of the lever 6 is provided with a depending weight 11 of any approved design, the outer oscillating end thereof being provided with a pointer 12, coöperating with a graduated segmental arc 13, on which are marked divisions preferably spaced so as to indicate the number of cups of liquid beverage which the ground coffee contained in the cup will yield. The arc 13 is preferably located to one side of the pivotal axis of the lever 6, so that the operator can conveniently read the graduations on the arc. When occasion requires that a certain number of cups of beverage shall be served, a certain quantity of coffee is ground and allowed to fall into the cup from the mill until the desired number of cups of liquid coffee is indicated on the arc 13 by the pointer. The weighing-cup is then removed and the beverage is accordingly prepared.

The present device is or forms a complete article of manufacture in the shape of a combined mill and scale and is a highly desirable adjunct to the kitchens of hotels, or private and boarding-houses, as a minimum amount of time is consumed in determining the quantity of coffee to be ground to yield a predetermined quantity of the liquid beverage. By my invention coffee of a constant strength and flavor can thus always be served. The plate or frame 1 can be secured in position to the wall of the kitchen or to any stationary object.

The division-marks on the graduated arc or scale 13 may have associated with them other marks (not here illustrated) indicative of the actual weight of the coffee ground, whereby the operator can thus ascertain at a glance not only the weight of the coffee that has been ground, but the number of cups of liquid coffee that said ground berry will yield. The weight 11 and the empty cup 10 hold the lever 6 in a normally horizontal position, when the pointer 12 will point to the zero-mark on the scale. The friction of the lever 6 on its pivot is controlled by a regulating-nut 14, carried by the reduced screw-threaded end of the arm 4.

Instead of securing the pointer 12 to the weighted end of the lever, an arrangement which necessitates attaching a separate plate on which the segmental arc 13 is marked, I may secure the pointer 12' directly to the short arm of the lever, properly deflecting the same that it may coöperate with an arc 13', marked on the frame proper. In fact, this is the preferred construction, as it makes the device as a whole more compact.

Having described my invention, what I claim is—

As an article of manufacture, a combined mill and scale comprising a frame, a hopper and mill therefor carried thereby, an arm projecting from the frame at a point to one side of the delivery-mouth of the mill, a lever pivoted at the free end of said arm, a friction-regulating nut for the lever, a yoke carried by or secured to the short arm of the lever, the free ends of the arms of which have formed thereon suitable hooks or saddles, said saddles being adapted to receive the trunnions of a suitable detachable cup for receiving the ground coffee from the delivery-mouth of the mill, a weight carried at the free end of the long arm of the lever, a pointer carried by the lever, and a graduated arc carried by the frame and coöperating with the pointer, the divisions on said arc being spaced to indicate the number of cups of liquid beverage which the ground coffee contained in the cup will produce, substantially as set forth.

In testimony whereof I affix my signature in presence of two witnesses.

FRANK W. GIBSON.

Witnesses:
EMIL STAREK,
ALFRED A. MATHEY.